United States Patent
Lee et al.

(10) Patent No.: US 11,052,877 B2
(45) Date of Patent: Jul. 6, 2021

(54) CLEANER USING HVAC MODULE

(71) Applicants: Hyundai Motor Company, Seoul (KR); Kia Motors Corporation, Seoul (KR); Hanon Systems, Daejeon (KR)

(72) Inventors: Jae Woo Lee, Gyeonggi-do (KR); Yong Chul Kim, Gyeonggi-do (KR); Jeung Sik Shin, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 275 days.

(21) Appl. No.: 16/380,711

(22) Filed: Apr. 10, 2019

(65) Prior Publication Data

US 2020/0156598 A1 May 21, 2020

(30) Foreign Application Priority Data

Nov. 19, 2018 (KR) .................. 10-2018-0142277

(51) Int. Cl.
| | |
|---|---|
| *B01D 46/00* | (2006.01) |
| *B60H 1/00* | (2006.01) |
| *B60S 1/64* | (2006.01) |
| *A47L 9/14* | (2006.01) |

(52) U.S. Cl.
CPC .............. *B60S 1/64* (2013.01); *A47L 9/1409* (2013.01); *B01D 46/0005* (2013.01); *B01D 46/0041* (2013.01); *B60H 1/00007* (2013.01); *B01D 2279/50* (2013.01); *B01D 2279/55* (2013.01)

(58) Field of Classification Search
CPC ............ B01D 46/0005; B01D 46/0041; B01D 2279/50; B01D 2279/55; B60H 1/00007; B60H 1/00592; B60H 1/00471; B60H 3/00
USPC ................... 55/385.1, 385.3, 473; 248/178.1
See application file for complete search history.

(56) References Cited

U.S. PATENT DOCUMENTS

| | | | | |
|---|---|---|---|---|
| 10,697,665 | B2 * | 6/2020 | Jung | F24F 13/14 |
| 2015/0192241 | A1 * | 7/2015 | Shannahan | F16H 7/14 |
| | | | | 248/178.1 |
| 2017/0319027 | A1 * | 11/2017 | Hyun | A47L 9/1608 |
| 2020/0016524 | A1 * | 1/2020 | Kim | B01D 46/24 |
| 2020/0158357 | A1 * | 5/2020 | Son | F24F 13/06 |
| 2020/0240166 | A1 * | 7/2020 | Graner | B60S 3/04 |

* cited by examiner

*Primary Examiner* — Minh Chau T Pham
(74) *Attorney, Agent, or Firm* — Mintz Levin Cohn Ferris Glovsky and Popeo, P.C.; Peter F. Corless

(57) ABSTRACT

A cleaner using a heating, ventilating, and air conditioning (HVAC) module is provided. The cleaner connects a ventilation fan for the HVAC module and a suction fan for vacuum cleaning to a single motor to independently drive the ventilation fan when the HVAC module is operated and to independently drive the suction fan when vacuum cleaning is performed. Accordingly, the number of components and production cost are reduced and, simultaneously, package assembly capability is improved.

11 Claims, 9 Drawing Sheets

→ : FLOW OF EXTERNAL AIR BY VENTILATION FAN FOR HVAC MODULE
--→ : FLOW OF SUCTIONED AIR WHEN CLEANING IS PERFORMED

⟶ : FLOW OF EXTERNAL AIR BY
    VENTILATION FAN FOR HVAC MODULE
--⟶ : FLOW OF SUCTIONED AIR WHEN
    CLEANING IS PERFORMED

CLEANER USING HVAC MODULE

CROSS-REFERENCE TO RELATED APPLICATION

This application claims under 35 U.S.C. § 119(a) the benefit of priority to Korean Patent Application No. 10-2018-0142277 filed on Nov. 19, 2018, the entire contents of which are incorporated herein by reference.

BACKGROUND

(a) Technical Field

The present disclosure relates to a vacuum cleaner using a heating, ventilating, and air conditioning (HVAC) module, and more particularly, to a cleaner using an HVAC module which independently drives a ventilation fan for an in-vehicle HVAC module and a ventilation fan for vacuum cleaning using a single motor.

(b) Background Art

As is well known, a vehicle is provided with a heating, ventilating, and air conditioning (HVAC) module as an air conditioning device for cooling and heating of an interior of the vehicle. Generally, the HVAC module includes a housing having an air inlet and an air outlet, an evaporator installed inside the housing and configured to cool air, a heater installed inside the housing and configured to heat air, and a blower configured to blow air toward the interior of the vehicle. In particular, the blower of a vehicular HVAC module includes a motor and a ventilation fan driven by the motor to circulate indoor air or supply external air to the vehicle.

Recently, to remove dusts and foreign materials from the interior of the vehicle, a separate motor for a vacuum cleaner and a vacuum cleaning tool interlocked therewith has been installed in the interior of the vehicle. However, since a motor of the blower for the vehicular HVAC module and the motor for the vacuum cleaner are installed separately, a structure for a limited installation space is complex, package assembly capability is decreased due to an increase of the number of parts, and at the same time, an increase in production cost is caused.

The above information disclosed in this section is merely for enhancement of understanding of the background of the disclosure and therefore it may contain information that does not form the prior art that is already known in this country to a person of ordinary skill in the art.

SUMMARY

In one aspect, the present disclosure provides a vacuum cleaner using a heating, ventilating, and air conditioning (HVAC) module, capable of reducing the number of parts and production cost and, simultaneously, improving package assembly capabilities by connecting a ventilation fan for a vehicular HVAC module and a suction fan for vacuum cleaning to a single motor to independently drive the ventilation fan for the vehicular HVAC module and the suction fan for vacuum cleaning.

In an exemplary embodiment, the present disclosure may include a cleaner using an HVAC module, the cleaner having a blower housing integrally formed at a main housing of the HVAC module, a motor having a bidirectional output shaft installed inside the blower housing, a ventilation fan for the HVAC module rotatably coupled to a first end part of the bidirectional output shaft in a clockwise direction, a cleaner housing provided in a structure in which an air inlet is formed at an outer side of the cleaner housing and coupled to one side part of the blower housing, a suction fan for a cleaner disposed inside the cleaner housing and rotatably coupled to a second end part of the bidirectional output shaft in a counterclockwise direction, and a dust collecting case configured to filter dust in air suctioned by driving of the suction fan for a cleaner.

A first outer ring bracket may be installed at the ventilation fan for the HVAC module, and a first clutch bearing may be installed between the first end part of the bidirectional output shaft and an inner diameter part of the first outer ring bracket to allow the ventilation fan for the HVAC module to be rotated only in the clockwise direction. A first bearing in rolling contact with an outer diameter part of the first outer ring bracket may further be installed at an outer part of the blower housing.

A second outer ring bracket may be installed at the suction fan for a cleaner, and a second clutch bearing may be installed between the second end part of the bidirectional output shaft and an inner diameter part of the second outer ring bracket to allow the suction fan for a cleaner to be rotated only in a counterclockwise direction. A second bearing in rolling contact with the second outer ring bracket may further be installed at an inner part of the cleaner housing.

An air inlet through which air flows from the dust collecting case may be formed at an outer side of the cleaner housing, and an air circulation path for cooling the motor may be formed at an inner side of the cleaner housing to guide the air flowing in the air inlet to the motor. In the cleaner housing, a diffuser having a guide aperture may be installed at a reverse-side position of the suction fan for a cleaner to guide the air flowing in through the air inlet to an air circulation path for cooling a motor.

The dust collecting case may be provided in a structure in which an air inlet through which external air is initially suctioned and an air outlet for discharging the external air toward an air inlet of the cleaner housing are formed and may be detachably installed at a lower portion of the main housing. A filter may be installed inside the dust collecting case to filter dust in the air flowing in through the air inlet. Additionally, a cleaning nozzle tube may be connected to the air inlet of the dust collecting case. A connecting duct may be connected between the air outlet of the dust collecting case and the air inlet of the cleaner housing to transfer the air filtered by the filter to the air inlet of the cleaner housing.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

Figure 1:
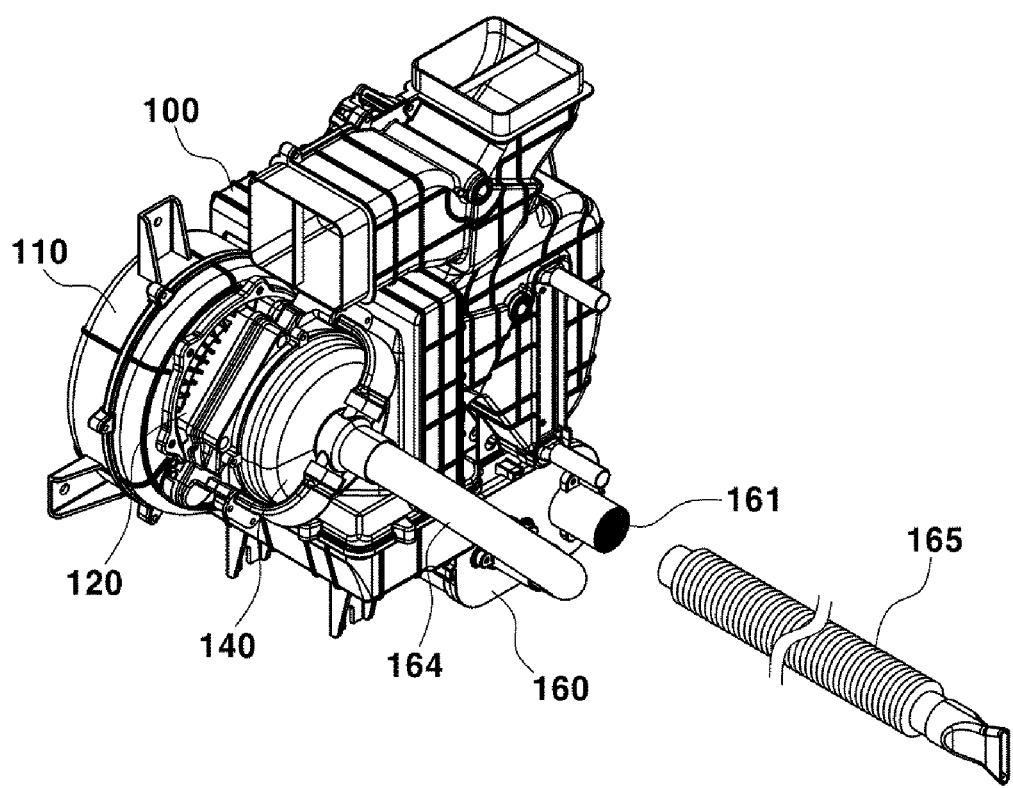
FIG. 1 is a detailed perspective view illustrating a cleaner using a heating, ventilating, and air conditioning (HVAC) module according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present disclosure will be described in detail with reference to the accompanying drawings.

Figure 2:
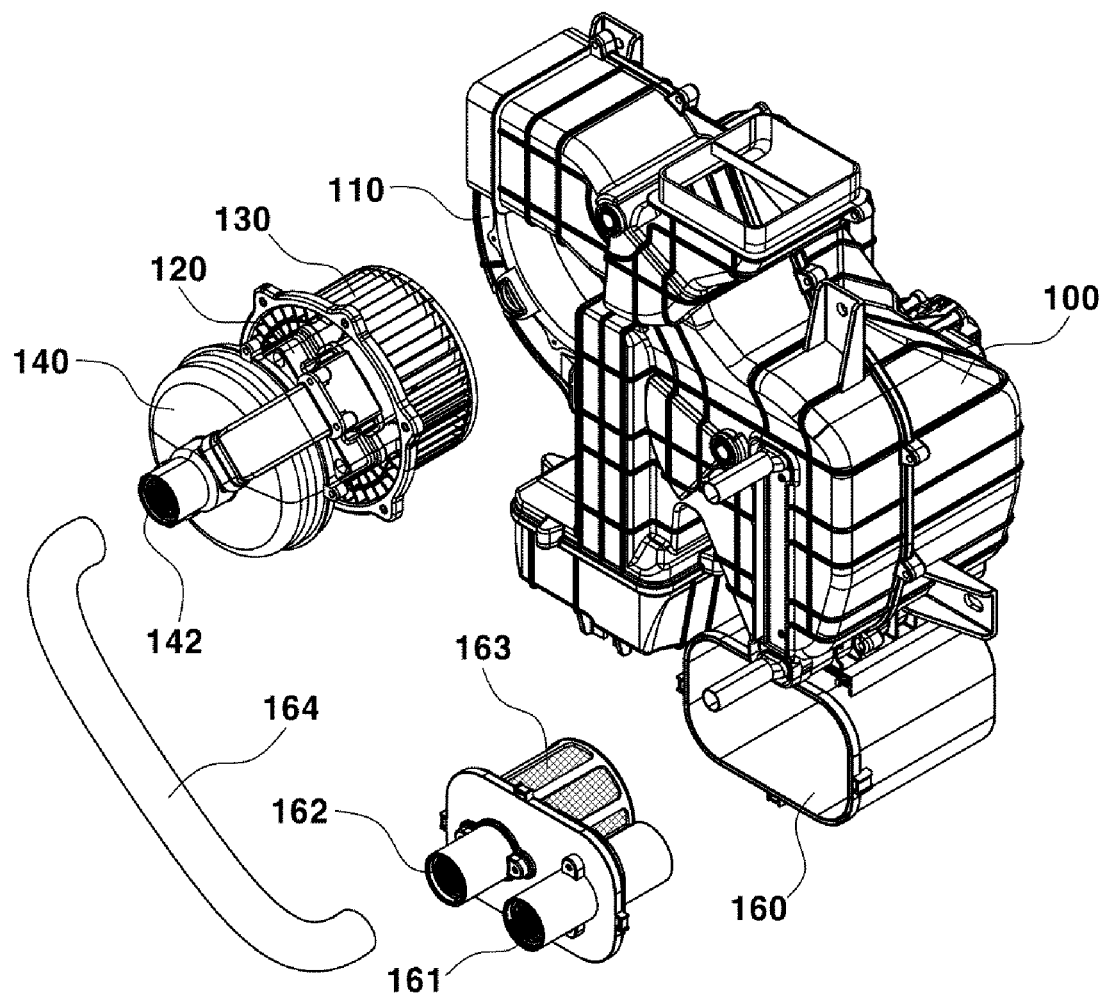
FIG. 2 is an assembled perspective view illustrating the cleaner using the HVAC module according to an exemplary embodiment of the present disclosure.

FIGS. 1 and 2 are perspective views illustrating a cleaner using a heating, ventilating, and air conditioning (HVAC) module according to the present disclosure, and a reference numeral 100 in each of FIGS. 1 and 2 indicates a main housing of the HVAC module. An evaporator, a heater, and the like may be installed inside the main housing 100, and a blower housing 110 may be formed integrally at a first side part of the main housing 100.

Further, a motor 120 having a bidirectional output shaft 122 may be installed inside the blower housing 110. The motor 120 may operate as a forward-reverse motor configured to rotate the bidirectional output shaft 122 in a forward direction (e.g., a clockwise direction) or a reverse direction (e.g., a counterclockwise direction). A ventilation fan 130 for the HVAC module may be coupled to an end of a first side of the bidirectional output shaft 122 of the motor 120 to be rotatable in the clockwise direction. The ventilation fan 130 for the HVAC module may be disposed at a position of one side of the blower housing 110.

Accordingly, when the bidirectional output shaft 122 of the motor 120 is rotationally driven in the clockwise direction, the ventilation fan 130 for the HVAC module may also be rotated in the clockwise direction to suction external air into the blower housing 110 and, simultaneously, ventilate the external air to the heater or the evaporator in the main housing 100. A cleaner housing 140 having an air inlet 142 formed thereat may be installed at the one side part of the blower housing 110, and a suction fan 150 for a cleaner configured to suction air containing dust may be disposed inside the cleaner housing 140 to be rotatable in the counterclockwise direction.

More specifically, a first end part of the bidirectional output shaft 122 of the motor 120 may be disposed to extend toward the cleaner housing 140. The suction fan 150 for a cleaner may be coupled to the first end part of the bidirectional output shaft 122 to be rotatable in the counterclockwise direction. The ventilation fan 130 for the HVAC module and the suction fan 150 for a cleaner may be connected together to the bidirectional output shaft 122 of the motor 120. However, when rotational power of the motor 120 is delivered to the ventilation fan 130 for the HVAC module (while the HVAC module is operated), the suction fan 150 may be maintained in a stationary state, whereas when the rotational power of the motor 120 is delivered to the suction fan 150 (during vacuum cleaning), the ventilation fan 130 for the HVAC module may be maintained in a stationary state.

Figure 3:
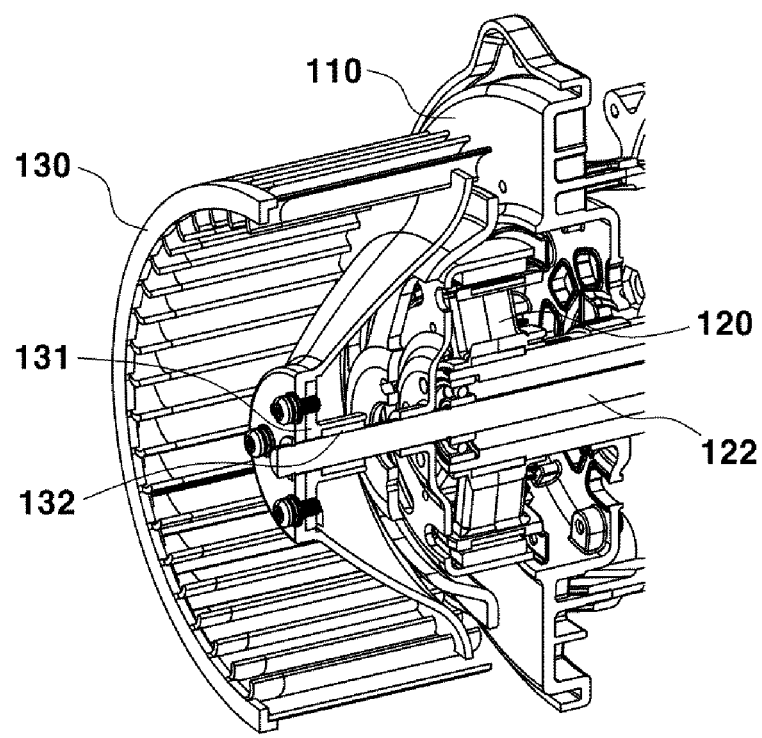
FIG. 3 is a cross-sectional perspective view of an essential part, which illustrates a state in which a ventilation fan for the HVAC module of the cleaner using the HVAC module according to an exemplary embodiment of the present disclosure is coupled to a bidirectional output shaft of a motor by a first clutch bearing.
Figure 4A:
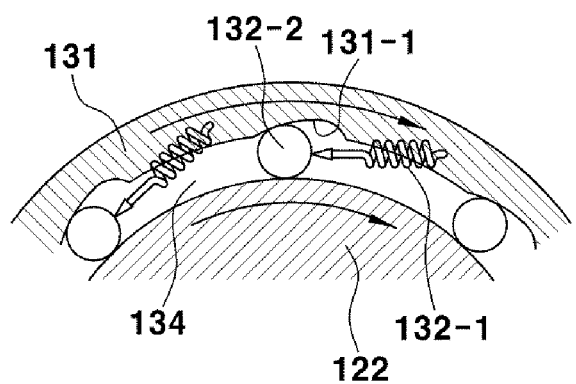
FIGS. 4A-4B are schematic diagrams for describing an operation principle of the first clutch bearing shown in FIG. 3 according to an exemplary embodiment of the present disclosure.
Figure 4B:
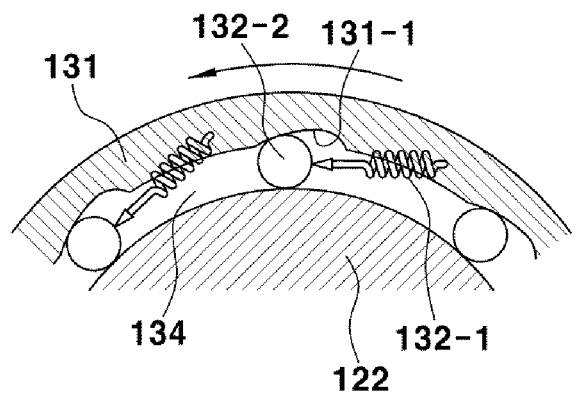

Accordingly, referring to FIGS. 3 and 4A-4B, a first outer ring bracket 131 may be installed on an inner surface of the ventilation fan 130 for the HVAC module, and a first clutch bearing 132 that allows the ventilation fan 130 for the HVAC module to be rotated only in the clockwise direction may be installed between a second end part of the bidirectional output shaft 122 and an inner diameter part of the first outer ring bracket 131. For example, the first clutch bearing 132 may include a spring 132-1 connected to an inner diameter surface of the first outer ring bracket 131, and a ball 132-2 press-fittably disposed in a gap space 134 between an outer diameter surface of the bidirectional output shaft 122 and the inner diameter surface of the first outer ring bracket 131 and elastically supported by the spring 132-1. A ball lock releasing space 131-1 may be formed on the inner diameter surface of the first outer ring bracket 131 at regular intervals in a circumferential direction.

Figure 6:
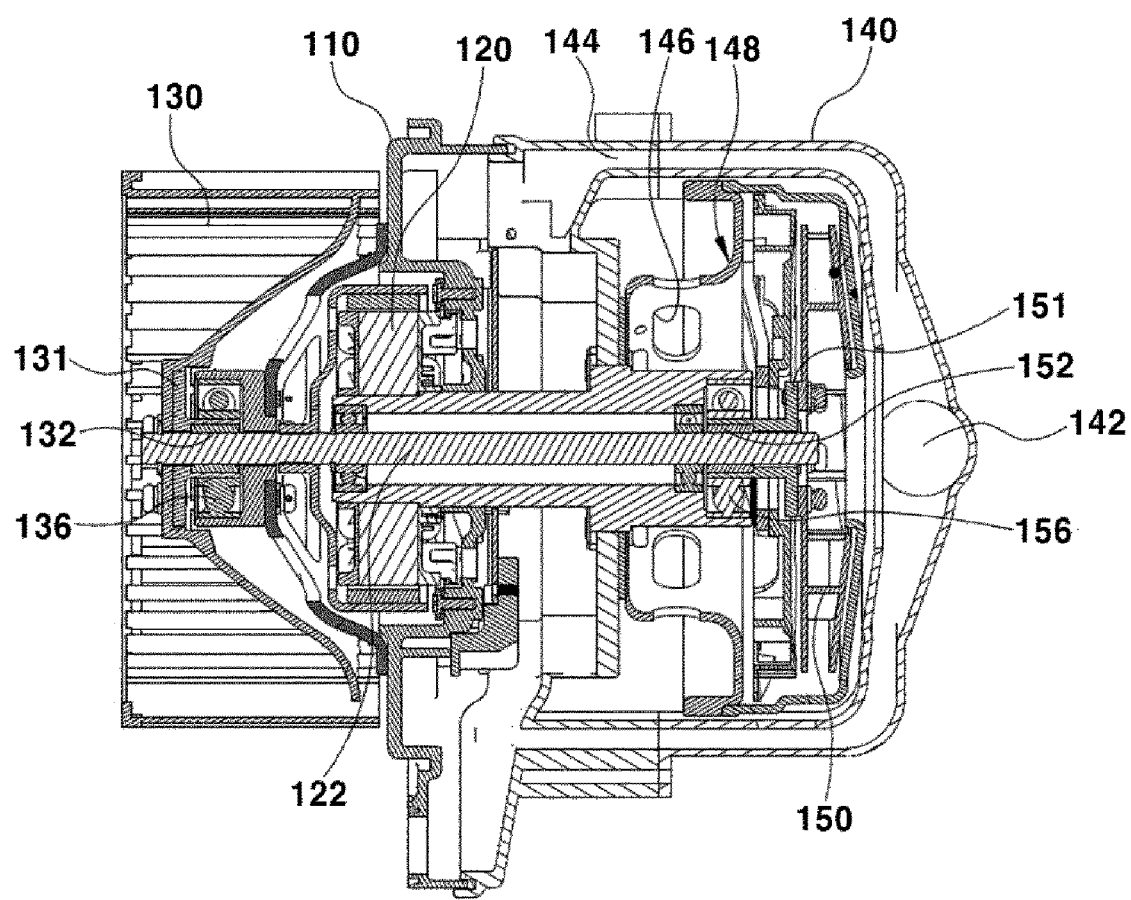
FIG. 6 is a cross-sectional view illustrating an assembled state of the cleaner using the HVAC module according to an exemplary embodiment of the present disclosure.

Meanwhile, referring to FIGS. 6 and 7, a second outer ring bracket 151 may be installed on the inner surface of the suction fan 150, and a second clutch bearing 152 may be installed between the first end part of the bidirectional output shaft 122 and an inner diameter part of the second outer ring bracket 151 to allow the suction fan 150 to be rotated only in the counterclockwise direction. For example, the second clutch bearing 152 may include a spring 152-1 connected to an inner diameter surface of the second outer ring bracket 151, and a ball 152-2 press-fittably disposed in a gap space 154 between the outer diameter surface of the bidirectional output shaft 122 and the inner diameter surface of the second outer ring bracket 151 and elastically supported by the spring 152-1. A ball lock releasing space 151-1 may be formed on the inner diameter surface of the first outer ring bracket 151 at regular intervals in the circumferential direction.

When the bidirectional output shaft 122 is rotated in the clockwise direction by forward drive or operation of the motor 120, as shown in FIG. 4A, the ball 132-2 elastically supported on the spring 132-1 may be pressed and fitted into the gap space 134 between the outer diameter surface of the bidirectional output shaft 122 and the inner surface of the first outer ring bracket 131, to be in a locked state. Consequently, the first outer ring bracket 131 may be rotated with the bidirectional output shaft 122 in the clockwise direction, and the ventilation fan 130 for an HVAC module coupled to the first outer ring bracket 131 may also be rotated in the clockwise direction to suction external air for cooling and heating of the interior of the vehicle.

Simultaneously, when the bidirectional output shaft 122 is rotated in the clockwise direction by the forward drive or operation of the motor 120, the ball 152-2 of the second clutch bearing 152 may enter the ball lock releasing space 151-1 of the second outer ring bracket 151 to block transmission of a rotational force of the bidirectional output shaft 122 to the second outer ring bracket 151. Accordingly, the suction fan 150 coupled to the second outer ring bracket 151 may be maintained in a stationary state.

Figure 7A:
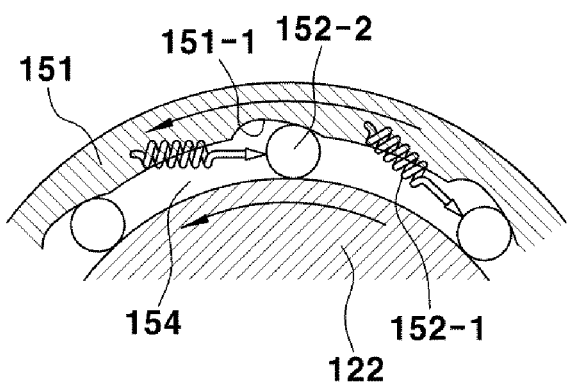
FIGS. 7A-7B are schematic diagrams for describing an operation principle of a second clutch bearing shown in FIG. 6 according to an exemplary embodiment of the present disclosure.

When the bidirectional output shaft 122 is rotated in the counterclockwise direction by reverse drive of the motor 120, as shown in FIG. 7A, the ball 152-2 elastically supported on the spring 152-1 may be pressed and fitted into the gap space 154 between the outer diameter surface of the bidirectional output shaft 122 and the inner surface of the second outer ring bracket 151, to be in a locked state. Consequently, the second outer ring bracket 151 may be rotated with the bidirectional output shaft 122 in the counterclockwise direction, and the suction fan 150 coupled to the second outer ring bracket 151 may also be rotated in the counterclockwise direction to suction air containing dust.

Simultaneously, when the bidirectional output shaft 122 is rotated in the clockwise direction by the reverse drive or operation of the motor 120, the ball 152-2 of the second clutch bearing 152 may enter the ball lock releasing space 151-1 of the second outer ring bracket 151 to block transmission of the rotational force of the bidirectional output shaft 122 to the second outer ring bracket 151. Accordingly, the suction fan 150 coupled to the second outer ring bracket 151 may be maintained in a stationary state.

Meanwhile, when disturbance acts on the first outer ring bracket 131 and the ventilation fan 130 for an HVAC module in the counterclockwise direction when the bidirectional output shaft 122 is stopped based on a stop of the motor 120 operation, as shown in FIG. 4B, the ball 132-2 may enter the ball lock releasing space 131-1 of the first outer ring bracket 131. Accordingly, the first outer ring bracket 131 and the ventilation fan 130 for an HVAC module may be freely rotated in the counterclockwise direction.

Figure 7B:
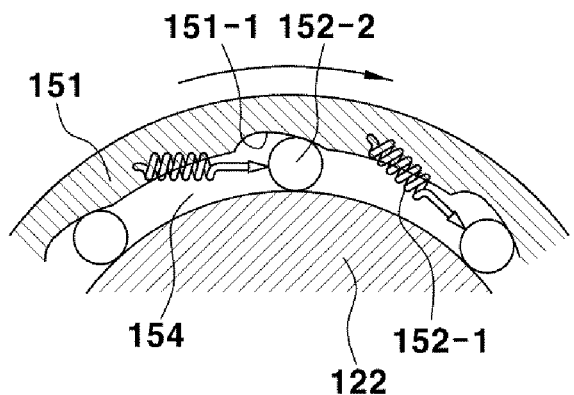

Similarly, when disturbance acts on the second outer ring bracket 151 and the suction fan 150 in the clockwise direction when the bidirectional output shaft 122 is stopped based on the stop of the motor 120 operation, as shown in FIG. 7B, the ball 152-2 enters the ball lock releasing space 151-1 of the second outer ring bracket 151. Accordingly, the second outer ring bracket 151 and the suction fan 150 may be freely rotated in the clockwise direction.

However, when the drive of the motor 120 is stopped, the ventilation fan 130 may be unnecessarily rotated in the counterclockwise direction due to disturbance, or the suction fan 150 may be unnecessarily rotated in the clockwise direction, and thus, durability may be degraded and a stable operation lifetime may be reduced. Accordingly, when the drive of the motor 120 is stopped, the ventilation fan 130 for an HVAC module and the suction fan 150 may be blocked to prevent being unnecessarily rotated.

Figure 5:
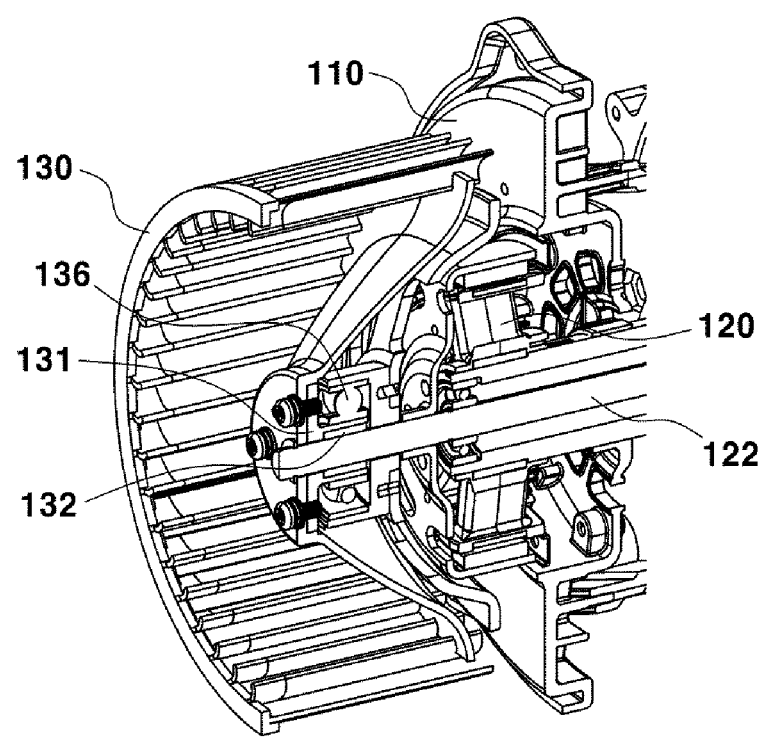
FIG. 5 is a cross-sectional perspective view of an essential part, which illustrates a state in which the first clutch bearing of the cleaner using the HVAC module according to an exemplary embodiment of the present disclosure is supported by a general bearing.

As shown in FIG. 5, a first bearing 136 in rolling contact with an outer diameter part of the first outer ring bracket 131 may be installed at an outer part of the blower housing 110 to support the first outer ring bracket 131 in a rotatable state. Further, as shown in FIG. 6, a second bearing 156 in rolling contact with the second outer ring bracket 151 may be installed at an inner part of the cleaner housing 140 to support the second outer ring bracket 151 in a rotatable state.

Accordingly, a support force of the first bearing 136 may block the first outer ring bracket 131 and the ventilation fan 130 from being unnecessarily rotated in the counterclockwise direction due to the disturbance. Further, a support force of the second bearing 156 may block the second outer ring bracket 151 and the suction fan 150 from being unnecessarily rotated in the clockwise direction due to the disturbance.

Meanwhile, a dust collecting case 160 that filters dust in air suctioned by a drive or operation of the suction fan 150 may be installed at a lower portion of the main housing 100. More specifically, the dust collecting case 160 may be disposed within a casing structure at which an air inlet 161 through which external air is initially suctioned and an air outlet 162 through which air is discharged to the air inlet 142 of the cleaner housing 140 are formed. The dust collecting case 160 may be detachably installed at the lower portion of the main housing 100 in a drawer structure (e.g., may be slid in and out of the lower portion of the main housing 100).

In particular, a filter 163 may be installed inside the dust collecting case 160 to filter only dust in the external air flowing into the air inlet 161 and allow the dust-filtered air to pass therethrough. A connecting duct 164 may be connected between the air outlet 162 of the dust collecting case 160 and the air inlet 142 of the cleaner housing 140 to transfer the air filtered by the filter 163 to the air inlet 142. A cleaning nozzle tube 165 which is a type of a tool that performs vacuum cleaning by being brought into close contact with a part of a cleaning target (e.g., a seat or a floor on which dusts are present) when a user performs cleaning may be connected to the air inlet 161 of the dust collecting case 160.

Hereinafter, an operational flow of a vacuum cleaner of the above-described configuration using the HVAC module of the present disclosure will be described.

Operation of HVAC Module

When the bidirectional output shaft 122 is rotated in the clockwise direction by the forward drive or operation of the motor 120, the ventilation fan 130 may be rotated to suction the external air by a power transmission operation of the first clutch bearing 132. More particularly, the ball 132-2 of the first clutch bearing 132 may be pressed and fitted into the gap space 134 between the outer diameter surface of the bidirectional output shaft 122 and the inner surface of the first outer ring bracket 131, to be in a locked state. Accordingly, the first outer ring bracket 131 may be rotated with the bidirectional output shaft 122 in the clockwise direction, and the ventilation fan 130 coupled to the first outer ring bracket 131 may also be rotated in the clockwise direction to suction the external air for cooling and heating of the interior of the vehicle.

Figure 8:
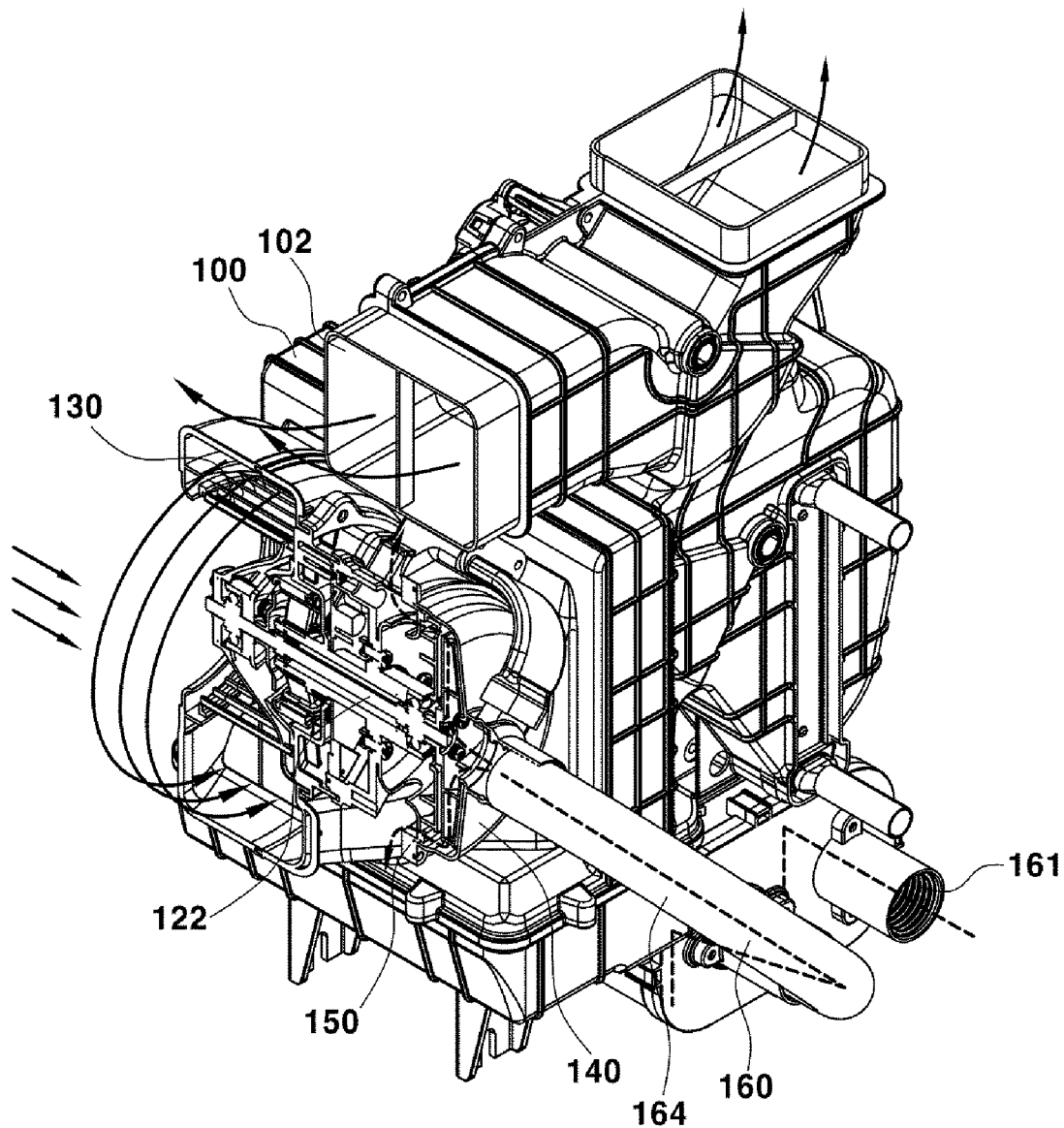
FIG. 8 is a cross-sectional perspective view illustrating an air flow during an operation of the HVAC module and an air flow during an operation of the cleaner according to an exemplary embodiment of the present disclosure.

Thus, as shown in FIG. 8, after the external air is suctioned by the ventilation fan 130, the external air passes through the evaporator or the heater, disposed inside the main housing 100, and then is discharged to an interior of a vehicle for heating or cooling through a discharge duct 102 formed at upper portion of the main housing 100. In particular, as described above, even when the bidirectional output shaft 122 is rotated in the clockwise direction by the forward drive of the motor 120, the ball 152-2 of the second clutch bearing 152 may enter the ball lock releasing space 151-1 of the second outer ring bracket 151 to block transmission of a rotational force of the bidirectional output shaft 122 to the second outer ring bracket 151. Accordingly, the suction fan 150 coupled to the second outer ring bracket 151 may be maintained in a stationary state.

Operation of Cleaner

When the bidirectional output shaft 122 is rotated in the counterclockwise direction by the reverse drive of the motor 120, the ventilation fan 150 may be rotated to suction the external air containing dust by a power transmission operation of the second clutch bearing 152. More particularly, the ball 152-2 of the second clutch bearing 152 may be pressed and fitted into the gap space 154 between the outer diameter surface of the bidirectional output shaft 122 and the inner diameter surface of the second outer ring bracket 151, to be in a locked state. Accordingly, the second outer ring bracket 151 may be rotated with the bidirectional output shaft 122 in the counterclockwise direction, and the ventilation fan 150 coupled to the second outer ring bracket 151 may also be rotated in the counterclockwise direction to allow a suction force for suctioning the external air containing dust to act on up to the cleaning nozzle tube 165.

Thus, when the user brings the cleaning nozzle tube 165 into close contact with a cleaning object or surface (e.g., a seat, a floor, or the like on which dust is present), the external air containing the dust may flow or be suctioned into the filter 163 through the air inlet 161 of the dust collecting case 160. The dust may then be filtered, and, as shown in FIG. 8, the filtered air may pass through the air inlet 142 of the cleaner housing 140 via the connecting duct 164 to be discharged to the outside.

In particular, as described above, even when the bidirectional output shaft 122 is rotated in the counterclockwise direction by the reverse drive of the motor 120, the ball 132-2 of the first clutch bearing 132 may enter the ball lock releasing space 131-1 of the first outer ring bracket 131 to block transmission of the rotational force of the bidirectional output shaft 122 to the first outer ring bracket 131. Accordingly, the ventilation fan 130 coupled to the first outer ring bracket 131 may be maintained in a stationary state.

Figure 9:
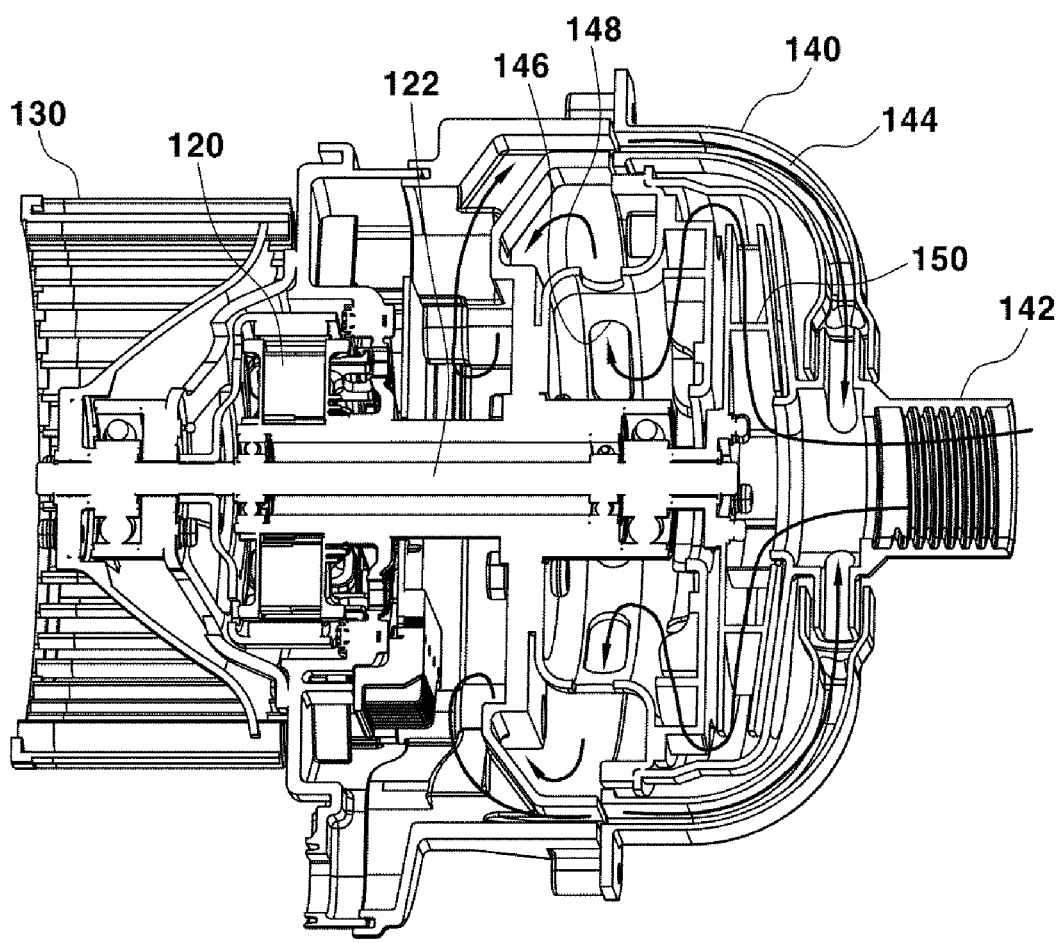
FIG. 9 is a cross-sectional perspective view illustrating a state in which air from which dusts are filtered flows to cool a motor during an operation of the cleaner using the HVAC module according to an exemplary embodiment of the present disclosure.

Meanwhile, the air (e.g., dust-filtered air) discharged to the outside after flowing into the cleaner housing 140 from the connecting duct 164 through an air inlet 142 may be utilized for cooling the motor 120. Accordingly, as shown in FIG. 9, an air circulation path 144 for cooling a motor may be formed inside the cleaner housing 140 to circulate the air flowing into the air inlet 142 toward the motor 120.

Further, in an interior of the cleaner housing 140, a diffuser 148 having a guide aperture 146 may be disposed at a reverse-side position of the suction fan 150 to guide the air flowing in through the air inlet 142 to the air circulation path 144 for cooling a motor. Thus, the air (dust-filtered air) flowing into the interior of the cleaner housing 140 from the connecting duct 164 through the air inlet 142 may be guided in an outer diameter direction through the guide aperture 146 of the diffuser 148, and simultaneously, the air may circulate up to a wall surface of the blower housing 110, in which the motor 120 is installed, along the air circulation path 144 for cooling a motor and then may be discharged to the outside. Accordingly, the motor 120 may be easily cooled through indirect heat exchange with the air, and thus performance and durability of the motor 120 may be improved.

Further, the air circulating along the air circulation path 144 for cooling a motor may not be directly supplied to the motor 120 and may circulate up to an outer wall surface of the blower housing 110, in which the motor 120 is installed, to indirectly cool the motor 120. Accordingly, infiltration of foreign materials and the like contained in the air into the motor 120 in the blower housing 110 may be prevented, and thus durability of the motor 120 may be maintained.

The present disclosure provides the following effects through the above-described problem solving means.

First, a ventilation fan for an HVAC module and a suction fan for vacuum cleaning may be independently driven using a single motor and a clutch bearing such that, as compared with a conventional method of using two or more motors such as a ventilation fan motor for an HVAC module, a suction fan motor for vacuum cleaning, and the like, the number of components and production cost may be reduced and, simultaneously, package assembly ability may be improved.

Second, since an air flow path according to an operation of the ventilation fan for an HVAC module and an air flow path according to an operation of the suction fan for vacuum cleaning may be separated from each other, contamination of the ventilation fan for an HVAC module may be prevented.

Third, air flowing in due to suction of the suction fan for vacuum cleaning passes through a portion adjacent to the motor and thus, the cooling effect of the motor and an inverter may be obtained.

Fourth, one-way clutch bearing may further be rotatably supported by a general bearing and thus, when the ventilation fan for an HVAC module and the suction fan for vacuum cleaning are not operated (in a stationary state), free rotation may be prevented, and when the ventilation fan for an HVAC module and the suction fan for vacuum cleaning are operated (in a rotated state), generation of noise may be suppressed.

Although the exemplary embodiments of the present disclosure have been described in detail, the scope of the prevent disclosure is not limited to these exemplary embodiments, and various modifications and improvements devised by those skilled in the art using the fundamental concept of the present disclosure, which is defined by the appended claims, further fall within the scope of the present disclosure.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A cleaner using a heating, ventilating, and air conditioning (HVAC) module, comprising:
   a blower housing integrally formed at a main housing of the HVAC module;
   a motor having a bidirectional output shaft installed inside the blower housing;
   a ventilation fan for the HVAC module rotatably coupled to a first end part of the bidirectional output shaft in a clockwise direction;
   a cleaner housing having an air inlet formed at an outer side of the cleaner housing, wherein the cleaner housing is coupled to one side part of the blower housing;
   a suction fan for a cleaner disposed inside the cleaner housing and rotatably coupled to a second end part of the bidirectional output shaft in a counterclockwise direction; and
   a dust collecting case configured to filter dust in air suctioned by driving of the suction fan.

2. The cleaner of claim 1, further comprising:
   a first outer ring bracket installed at the ventilation fan; and
   a first clutch bearing installed between the first end part of the bidirectional output shaft and an inner diameter part of the first outer ring bracket to allow the ventilation fan to be rotated only in the clockwise direction.

3. The cleaner of claim 2, wherein a first bearing in rolling contact with an outer diameter part of the first outer ring bracket is installed at an outer part of the blower housing.

4. The cleaner of claim 1, further comprising:
   a second outer ring bracket installed at the suction fan; and
   a second clutch bearing installed between the second end part of the bidirectional output shaft and an inner diameter part of the second outer ring bracket to allow the suction fan to be rotated only in a counterclockwise direction.

5. The cleaner of claim 4, wherein a second bearing in rolling contact with the second outer ring bracket is installed at an inner part of the cleaner housing.

6. The cleaner of claim 1, further comprising:
   an air inlet formed at an outer side of the cleaner housing and through which air flows from the dust collecting case; and
   an air circulation path formed at an inner side of the cleaner housing to guide the air flowing in the air inlet to the motor to cool the motor.

7. The cleaner of claim 6, wherein, in the cleaner housing, a diffuser having a guide aperture is installed at a reverse-side position of the suction fan to guide the air flowing in through the air inlet to an air circulation path to cool a motor.

8. The cleaner of claim 1, wherein the dust collecting case includes:
   an air inlet through which external air is initially suctioned; and
   an air outlet for discharging the external air toward an air inlet of the cleaner housing,
   wherein the dust collecting case is detachably installed at a lower portion of the main housing.

9. The cleaner of claim 8, wherein a filter is installed inside the dust collecting case to filter dust in the air flowing in through the air inlet.

10. The cleaner of claim 8, wherein a cleaning nozzle tube is connected to the air inlet of the dust collecting case.

11. The cleaner of claim 8, wherein a connecting duct is connected between the air outlet of the dust collecting case and the air inlet of the cleaner housing to transfer the air filtered by the filter to the air inlet of the cleaner housing.

* * * * *